No. 680,673. Patented Aug. 13, 1901.
E. DIEDRICH.
BLIND FOR THE EYES OF ANIMALS.
(Application filed Mar. 29, 1900. Renewed May 17, 1901.)
(No Model.)
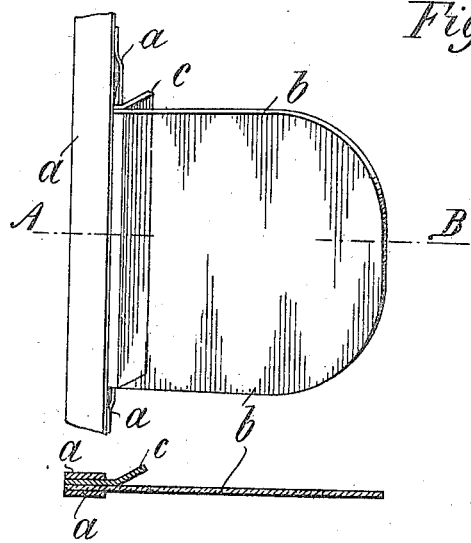
Fig. 1.
Fig. 2.
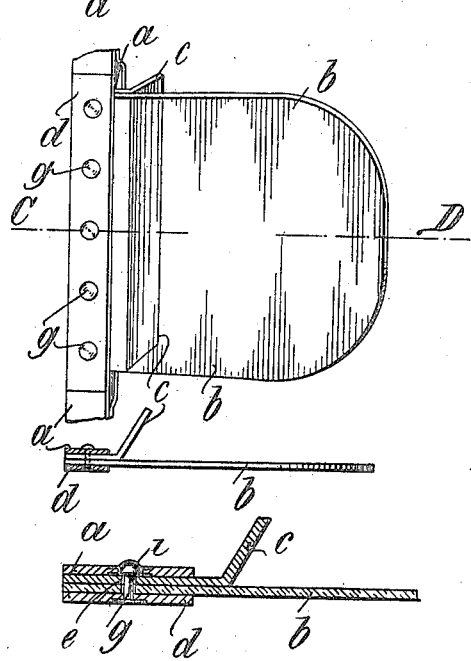
Fig. 3.
Fig. 4.
Fig. 5.
Witnesses:
Inventor:

UNITED STATES PATENT OFFICE.

ERNST DIEDRICH, OF HAMBURG, GERMANY.

BLIND FOR THE EYES OF ANIMALS.

SPECIFICATION forming part of Letters Patent No. 680,673, dated August 13, 1901.

Application filed March 23, 1900. Renewed May 17, 1901. Serial No. 60,756. (No model.)

*To all whom it may concern:*

Be it known that I, ERNST DIEDRICH, merchant, a subject of the German Emperor, residing at No. 261 Eppendorferweg, Hamburg, Germany, have invented new and useful Improvements in or Relating to Blinds for the Eyes of Animals, of which the following is a specification.

The present invention relates to improvements in or relating to blinds for the eyes of animals.

The hitherto-employed blinds suffer from the great defect that the visual area for the eyes of the horse is limited by the opaque blinds. The advantage gained by these opaque blinds—viz., to hide from the view of the horse what is happening behind its eyes—is rendered illusive by the great defect that the horse is all the more induced to become shy and restive owing to its optic nerves being forced to act only in a forward direction, contrary to the natural formation and inclination of the eye. Apart from this the usually-employed opaque blinds frequently cause lasting disturbances in the sight of the horse.

The object of the present invention is to obviate these drawbacks and to render more efficient, durable, and serviceable in operation this class of devices.

In the accompanying drawings I have shown blinds constructed according to the present invention.

Figure 1 is a lateral elevation. Fig. 2 represents a section on line A B of Fig. 1. Fig. 3 illustrates in lateral elevation a somewhat modified construction of the blinds with means for rendering same interchangeable. Fig. 4 is a plan view of same; and Fig. 5 is a section on line C D of Fig. 3 on an enlarged scale.

The blinds are attached in the usual manner to the cheek-strap $a$ of the horse's bridle and, essentially, comprise, as illustrated in Figs. 1 and 2, a large blind $b$ and a small blind $c$. The larger blind $b$ consists of a smooth piece of celluloid or any other transparent material, which may be ornamented in any desired or suitable manner. By employing transparent material—viz., celluloid—the advantage is gained that the light may penetrate the blind, so that the lateral visual area for the eye of the horse is not covered up, but that the objects in the field of sight appear to be more removed that they actually are.

At the rear external end of the large blind $b$ the small blind $c$ is secured, its free portion occupying an angular position in regard to the blind $b$. This blind $c$ is of any suitable shape and made of opaque material, such as leather and the like. It serves for the purpose of limiting the visual area of the eye of the horse toward the rear. The two blinds $b$ and $c$ are secured to the cheek-strap $a$ in any convenient suitable manner.

The somewhat-modified construction of my improved blinds illustrated in Figs. 3, 4, and 5 is distinguished from the construction previously described by rendering the blinds $b\,c$ interchangeable, so that differently-colored celluloid plates may be employed. It may, for instance, be advisable to employ colored blinds $b$ when the sun is shining very brightly or when the ground is covered with snow, which provision protects the eye of the horse, and thus indirectly its optic nerves as well.

To render the blinds interchangeable, the portion $d$ of the duplicated cheek-strap $a$ is removable and fitted with studs $g$, having a long stem. In accordance with the number, position, and shape of these studs $g$ cups $i$, fitted with a divided spring-cover, are arranged in the cheek-strap $a$, so that the cups $i$ may be engaged by the heads of the studs $g$ and the latter separated therefrom by a sharp pull similar to the well-known glove-fasteners. I wish it, however, to be understood that I do not limit myself to any particular construction of these spring-buttons.

The modifications shown in Figs. 3 to 5 further enable the removal of both (large and small) blinds $c$ and $b$, so that the bridle can be used with a riding-horse.

The rear end of the blinds $b\,c$ are provided with holes $e$ in accordance with the size, number, and position of the spring-buttons $g$. After having placed the blinds $b\,c$, or $b$ alone, if required, on the cheek-strap $a$, so that the holes $e$ in the blinds coincide with each other and with the cups $i$, the studs $g$ on the strap $a$ are passed through the holes $e$ in the blinds and pressed into the cups *i* on the strap *a*.

What I claim as new, and desire to secure by Letters Patent, is—

1. The combination in blinds for the eyes of animals, of a large blind of transparent material and a small blind of opaque material standing angularly at the rear of the large blind, substantially as set forth.

2. The combination in interchangeable blinkers for the eyes of animals, of a large blinker of transparent material, a small blinker of opaque material standing angularly at the rear of the large blinker and of means for securing these blinkers interchangeably to the cheek-straps of the horse's bridle, substantially as set forth.

In testimony whereof I have hereunto set my hand in presence of two subscribing witnesses.

ERNST DIEDRICH.

Witnesses:
E. H. L. MUMMENHOFF,
IDA HAFERMANN.